(12) United States Patent
Roland

(10) Patent No.: US 11,098,690 B2
(45) Date of Patent: Aug. 24, 2021

(54) BREAKING WAVE POWER GENERATION

(71) Applicant: Vincent Roland, Rockledge, FL (US)

(72) Inventor: Vincent Roland, Rockledge, FL (US)

( * ) Notice: Subject to any disclaimer, the term of this patent is extended or adjusted under 35 U.S.C. 154(b) by 0 days.

(21) Appl. No.: 16/932,230

(22) Filed: Jul. 17, 2020

(65) Prior Publication Data

US 2021/0017954 A1  Jan. 21, 2021

Related U.S. Application Data

(60) Provisional application No. 62/875,184, filed on Jul. 17, 2019.

(51) Int. Cl.
| | |
|---|---|
| *F03B 17/06* | (2006.01) |
| *F03B 13/26* | (2006.01) |
| *F03B 13/18* | (2006.01) |

(52) U.S. Cl.
CPC .......... *F03B 17/063* (2013.01); *F03B 13/264* (2013.01); *F03B 13/184* (2013.01); *F03B 13/187* (2013.01); *F05B 2240/12* (2013.01); *F05B 2240/93* (2013.01)

(58) Field of Classification Search
CPC .... F03B 17/063; F03B 13/264; F03B 13/184; F03B 13/187; F05B 2240/12; F05B 2240/93
USPC ...................................... 290/42, 53
See application file for complete search history.

(56) References Cited

U.S. PATENT DOCUMENTS

| | | | |
|---|---|---|---|
| 244,221 A | 7/1881 | Fountain | |
| 1,003,635 A | 9/1911 | Melander | |
| 1,617,568 A | 2/1927 | Bloss | |
| 1,716,751 A | 6/1929 | Avakian | |
| 1,782,277 A | 11/1930 | Smith | |
| 1,793,743 A | 2/1931 | McHenry | |
| 3,687,567 A | 8/1972 | Lininger | |
| 3,993,913 A * | 11/1976 | Dickman | F03B 13/268 290/53 |

(Continued)

FOREIGN PATENT DOCUMENTS

| | | |
|---|---|---|
| FR | 2 458 691 A1 | 1/1981 |
| GB | 2 397 853 A | 8/2004 |

(Continued)

OTHER PUBLICATIONS

The Wheel Turns, The Economist, pp. 1-2 Feb. 3, 2018.

*Primary Examiner* — Charles Reid, Jr.
(74) *Attorney, Agent, or Firm* — Browdy and Neimark, P.L.L.C.

(57) ABSTRACT

A breaking waves power generator includes a platform, a plurality of water wheels rotatably mounted within the platform, and a deck plate mounted within the platform. The water wheels include a plurality of vanes, blades, paddles, or buckets that, when impacted by breaking water waves, cause rotation of the water wheels. Breaking water waves can travel over the deck plate. The deck plate has an angular position and horizontal position relative to the platform that are adjustable to guide the breaking water waves so that the water waves break against the vanes, blades, paddles, or buckets of the water wheels, causing rotation of the water wheels from which power is generated. A ramp is connected to the platform in front of the water wheels, over which water is guided to the platform so that water waves break against the water wheels.

16 Claims, 4 Drawing Sheets

(56) References Cited

U.S. PATENT DOCUMENTS

| | | | | |
|---|---|---|---|---|
| 4,137,005 | A * | 1/1979 | Comstock | F03B 13/184 415/24 |
| 4,731,544 | A * | 3/1988 | Jones | F03B 13/188 290/53 |
| 7,525,212 | B1 * | 4/2009 | Catlin | F03B 13/188 290/53 |
| 7,607,862 | B2 * | 10/2009 | Thorsbakken | F03B 17/061 405/76 |
| 10,100,803 | B1 * | 10/2018 | Alvarado | H02K 7/1823 |
| 2010/0237625 | A1 * | 9/2010 | Dempster | F03B 7/00 290/54 |
| 2013/0229014 | A1 * | 9/2013 | Willingham | F03B 13/10 290/54 |
| 2019/0301424 | A1 * | 10/2019 | Van Boxel | H02K 7/1823 |

FOREIGN PATENT DOCUMENTS

| | | |
|---|---|---|
| WO | 00/71891 A1 | 11/2000 |
| WO | 2010/107906 A2 | 9/2010 |

* cited by examiner

BREAKING WAVE POWER GENERATION

TECHNICAL FIELD

The field of the invention generally relates generation of power from breaking waves, and more particularly to power generation using water wheel technology to transform the kinetic energy of breaking waves into mechanical rotational energy (MRE).

BACKGROUND

Techniques for transforming the kinetic energy of moving water into mechanical rotational energy have been known for hundreds of years. When water moves at a sufficiently rapid rate, it creates harvestable amounts of kinetic energy. Many techniques have been used to transform the kinetic energy of such flowing water into mechanical rotational energy. Some mechanisms for carrying out these techniques, such as the water wheel, are very old.

The technology for using a water wheel to turn kinetic water energy into mechanical rotational energy is hundreds of years old. The Barbegal water wheel system is a good example. The source of its kinetic energy was a river flowing downhill. Many moving water kinetic energy sources have been used to power water wheels, where the moving water kinetic energy source is not breaking waves.

When a wave of water breaks, it releases a tremendous amount of kinetic energy, and the breaking wave continues to produce kinetic energy until all of the wave's potential energy has been turned into kinetic energy. Many devices have been designed to turn wave motion into mechanical rotational energy, where the kinetic force that is directly harnessed is not the force of a wave breaking.

SUMMARY

In one general aspect, the invention features a breaking waves power generator that includes a platform, at least one water wheel rotatably mounted within the platform, and a deck plate mounted within the platform. The water wheel includes a plurality of vanes, blades, paddles, or buckets that, when impacted by breaking water waves, cause rotation of the water wheel. Breaking water waves can travel over the deck plate. The deck plate has an angular position relative to the platform that is adjustable to guide the breaking water waves so that the water waves break against the vanes, blades, paddles, or buckets of the at least one water wheel, causing rotation of the water wheel from which power is generated.

In certain embodiments, there are a plurality of water wheels mounted within the platform, and the angular position and a horizontal position of the deck plate are adjustable to guide the breaking water waves so that the water waves break against the vanes, blades, paddles, or buckets of each of the plurality of water wheels. A ramp is connected to the platform in front of the water wheels, over which water is guided to the platform so that water waves break against the water wheels. An angular position and horizontal position of the ramp relative to the platform are adjustable to guide water to the platform so that water waves break against the water wheels. Two vertical walls are attached to sides of the ramp, the vertical walls extending upwards from the ramp through a surface of the water. At least a portion of the ramp may be flared outwardly away from the platform to create a funnel that channels water into the at least one water wheel. At least one ballast tank has an interior space into which water can be pumped to assist with angular lower of the ramp or out of which water can be pumped to assist with angular raising of the ramp. The deck plate is positioned underneath the water wheels. The water wheels have a radius greater than a maximum height of the breaking water waves, an axis of the water wheels being higher than the maximum height of the breaking water waves.

In another general aspect, the invention features a method for generating power from breaking waves that includes providing a platform, at least one water wheel mounted within the platform, comprising a plurality of vanes, blades, paddles, or buckets, and a deck plate mounted within the platform. The platform is positioned in water so that breaking water waves can travel over the deck plate. An angular position of the deck plate relative to the platform is adjusted to guide the breaking water waves so that the water waves break against the vanes, blades, paddles, or buckets of the at least one water wheel to cause rotation of the water wheel from which power is generated.

The details of various embodiments of the invention are set forth in the accompanying drawings and the description below. Other features and advantages of the invention will be apparent from the description, the drawings, and the claims.

DETAILED DESCRIPTION

Figure 1:
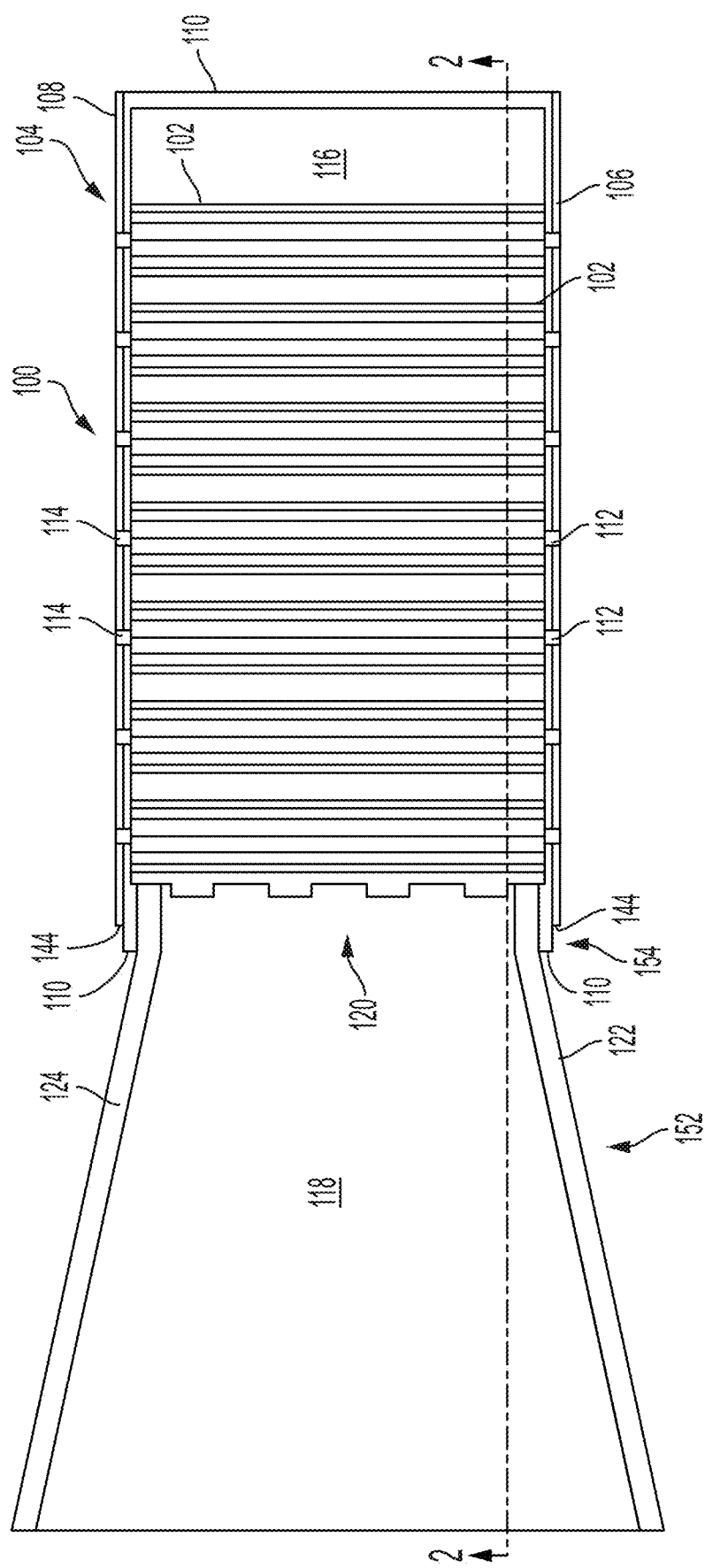
FIG. 1 is a top view of a breaking waves power generator according to the invention.
Figure 2:
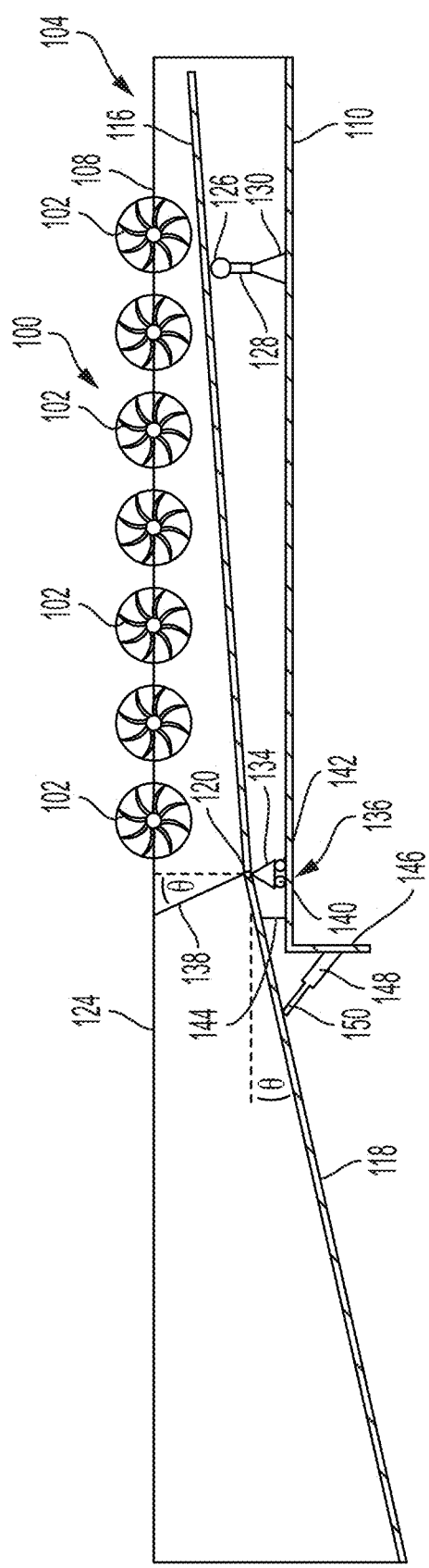
FIG. 2 is a cross-sectional view of the breaking waves power generator of FIG. 1 taken along line 2-2 in FIG. 1.

With reference to FIGS. 1 and 2, a breaking waves power generator (BWPG) 100 according to the invention use water wheel technology to transform the kinetic energy of breaking waves into mechanical rotational energy. Similar to the Barbegal water wheel system, the breaking waves power generator uses a series of water wheels 102 to accomplish this goal. The water wheels 102 are placed in a series similar to the construction of a roller conveyer, one wheel behind the other. In this arrangement, wheels 102 are attached to a platform 104. Water wheels 102 may be of a standard construction for such wheels as is known in the art, and may include two disk-shaped walls, on each side of the wheel, with a set of curved vanes mounted on a central axle between the two disk-shaped walls. Alternatively, water wheels 102 may be constructed using blades, paddles, or buckets instead of vanes as is known in the art. The water wheels are connected to electric power generators that transform the mechanical rotational energy into electric power.

Platform 104 consists of two rectangular walls 106 and 108 attached to two sides of rectangular base 110. Walls 106 and 108 are attached to base 110 along respective sides of the length of the base. This construction is similar to a floating dry dock. Deck 116 fits within platform walls 106 and 108, as is shown in FIG. 1. The series of water wheels 102 are placed between walls 106 and 108 of platform 104. Each water wheel 102 has an axle, having ends 112 and 114 that are secured to the top of respective walls 106 and 108, forming the sole attachment of each water wheel 102 to platform 104. Axle ends 112 and 114 can fit within open grooves in the top of platform walls 106 and 108, or, alternatively, can be attached to platform walls 106 and 108 by bearings in one particular embodiment, half of the diameter of each water wheel hangs below the tops of walls 106 and 108.

The bottom of platform 104 includes rectangular base 110 and deck plate 116, which is positioned on top of base 110. Deck plate 116 extends the length of base 110, and extends up to the inner sides of walls 106 and 108. One end of deck plate 116 is attached and hinged within platform 104 along the width of the platform by hinge 120, thereby allowing deck plate 116 to swing upward from base 110. When deck plate 116 is swung upward from base 110, an angle is created between base 110 and deck plate 116. This angle causes the distance between the bottom of water wheels 102 and deck plate 116 to decrease from the hinged end of deck plate 116 to its other end.

The angle between base 110 and deck plate 116, and the distance between deck plate 116 and base 110 at any given point along the length of deck plate 116, is adjustable to ensure that waves that break into platform 104 continue to break along the length of the platform. Thus, deck plate 116 acts as a beach in the way that a beach causes waves to break all the way to shore.

A ramp 118 is attached to the end of platform 104 at which deck plate 116 is hinged to base 110. Ramp 118 is attached to and hinged around the same hinge 120 as deck plate 116, with ramp 118 and deck plate 116 having interleaving annular knuckles surrounding a central pin of hinge 120, thereby allowing rotational adjustment of deck plate 116 and ramp 118, independently of each other, around the central pin of hinge 120. Ramp 118 extends outwardly from platform 104 and has a short rectangular portion 154 near platform 104 that extends to a flared portion 152 that flares outwardly as is shown in FIG. 1. Similar to deck plate 116, ramp 118 can rotate upward or downward in relative to platform 104. The short rectangular portion of ramp 118 near platform 104 ensures that as the angle of ramp 118 relative to platform 104 is adjusted, none of the flared portion of ramp 118 can jam within platform walls 106 and 108. The angle of ramp 118 relative to horizontal causes incoming waves or swells of water to break directly into the leading water wheel. Ramp 118 widens as it extends outward from platform 104. On each side of ramp 118, walls 122 and 124 are attached to and extend along the length of ramp 118. The height of ramp walls 122 and 124 at the point closest to platform 104 is the same as the height of platform walls 106 and 108. More specifically, when ramp 118 is rotated to its highest upward position (which in some embodiments may be a horizontal position), the edges 138 of ramp walls 112 and 124 at the point closest to platform 104 are vertical and have the same height as platform walls 106 and 108. In one embodiment of the invention, the angle θ between ramp the edges 138 of walls 112 and 124 and vertical should be the same as the angle θ between ramp 118 and horizontal. The height of ramp walls 122 and 124 increases as ramp walls 122 and 124 extend from platform 104. This increase in height is determined by the greatest downward angle that ramp 118 can make relative to platform 104. More specifically, when ramp 118 is at its greatest downward angle, the upper edges of ramp walls 122 and 124 are parallel to the surface of the water and are at the same height as the upper edges of platform walls 106 and 108. The gaps between platform walls 106 and 108 on the one hand and, on the other hand, deck plate 116, the short rectangular portion of ramp 118, and water wheels 102, are large enough to ensure that deck plate 116, ramp 118, and water wheels 102 are rotatable without interference from platform walls 106 and 108.

If A is the height of platform walls 106 and 108, and D is the length of ramp 118, then the height of ramp walls 122 and 124 at the end of the length of ramp 118 should be A+B where B=sin (maximum θ)×D, so that when ramp is at its greatest downward angle (maximum θ) the tops of ramp walls 122 and 124 are at the same height as the tops of platforms walls 106 and 108.

The above-described design creates a three-sided funnel, having a flat bottom, that channels incoming waves directly into the leading water wheel on platform 104. Ramp 118 can be adjustably set at an angle that causes incoming waves to break directly into the leading water wheel.

Hinge 120 is movable in horizontally along a portion of the length of platform 104. The horizontal position and angle of deck plate 116 can be adjustably set so as to keep waves breaking against all of the water wheels 102 along the length of platform 104. The breaking waves are thus turned into a pulsating river flowing past the series of water wheels 102 through platform 104, so that the kinetic energy of the breaking waves is transformed into mechanical rotational energy.

Hinge 120 can also be raised and lowered in addition to being moved horizontally. This movement helps adjust ramp 118 and deck plate 116 to cause the waves to break properly into and through the platform water wheels 102. The horizontal movability of hinge 120 can accommodate different wave conditions, such as waves spaced relatively close to each other or spaced relatively far apart from each other, by allowing ramp 118 to be pushed farther out or pulled inwards to ensure that waves break into the first water wheel in a manner that causes the water wheel to absorb the greatest amount of energy.

The angle of ramp 118 can be set depending on the sizes of the waves. Generally, the larger the wave, the greater the depth of ramp 118 that is required to ensure that the wave does not mount up and break before it reaches the first water wheel.

In general, a human operator can adjust the angles of ramp 118 and deck plate 116 and the horizontal position of hinge 120 by observing conditions of the water and of the waves breaking against the water wheels, and can make adjustments accordingly, in a manner analogous to sailing a sailboat. For example, as waves become smaller, the human operator could move the ramp angularly upwards and also increase the angle of the deck plate relative to the rectangular base of the platform. Alternatively, this process could be automated through use of detectors and a processor that controls operation of the hydraulic lifts and gear drive described below.

With reference to FIG. 2, deck plate 116 is supported, near its longitudinal end farthest from hinge 120, by a roller 126 connected by rod 128 to hydraulic lift 130, which rests on rectangular base 110. Deck plate 116 is illustrated in FIG. 2 at a horizontal angle relative to rectangular base 110, which might be appropriate for handling very large waves. Hydraulic lift 130 can raise rod 128 to lift roller 126 and thereby increase the angle of deck plate 116 relative to rectangular base 110, and can lower rod 128 to lower roller 126 and thereby decrease the angle of deck plate 116 relative to rectangular base 110. Hinge 120 is connected to a hydraulic lift 134 supported by a gear drive 136 having two wheels 140, 142, which gear drive 136 can be driven back and forth by electric motor, so that the height of hinge 120 and its horizontal position can be adjusted. Gear drive 136 allows hinge 120 to be adjustable horizontally in position throughout a range extending from the leftmost end of platform 104 to the position shown in FIG. 2.

As is shown in FIG. 2, rectangular base 110 extends slightly past a vertical edge 144 of walls 106 and 108 of platform 104 and has an extension 146 that is angled downward at a right angle relative to the main portion of rectangular base 110. Extension 146 supports a hydraulic lift 148 that causes ramp 118, along with ramp walls 122 and 124 attached thereto, to be raised or lowered via rod 150.

With reference FIG. 1, each of ramp walls 122 and 124 has a thickness sufficient to allow an interior space thereof to function as a ballast tank. Water can be pumped into the ballast tanks to assist with angular lowering of ramp 118, and water can be pumped out of the ballast tanks to assist with angular raising of ramp 118.

Figure 3:
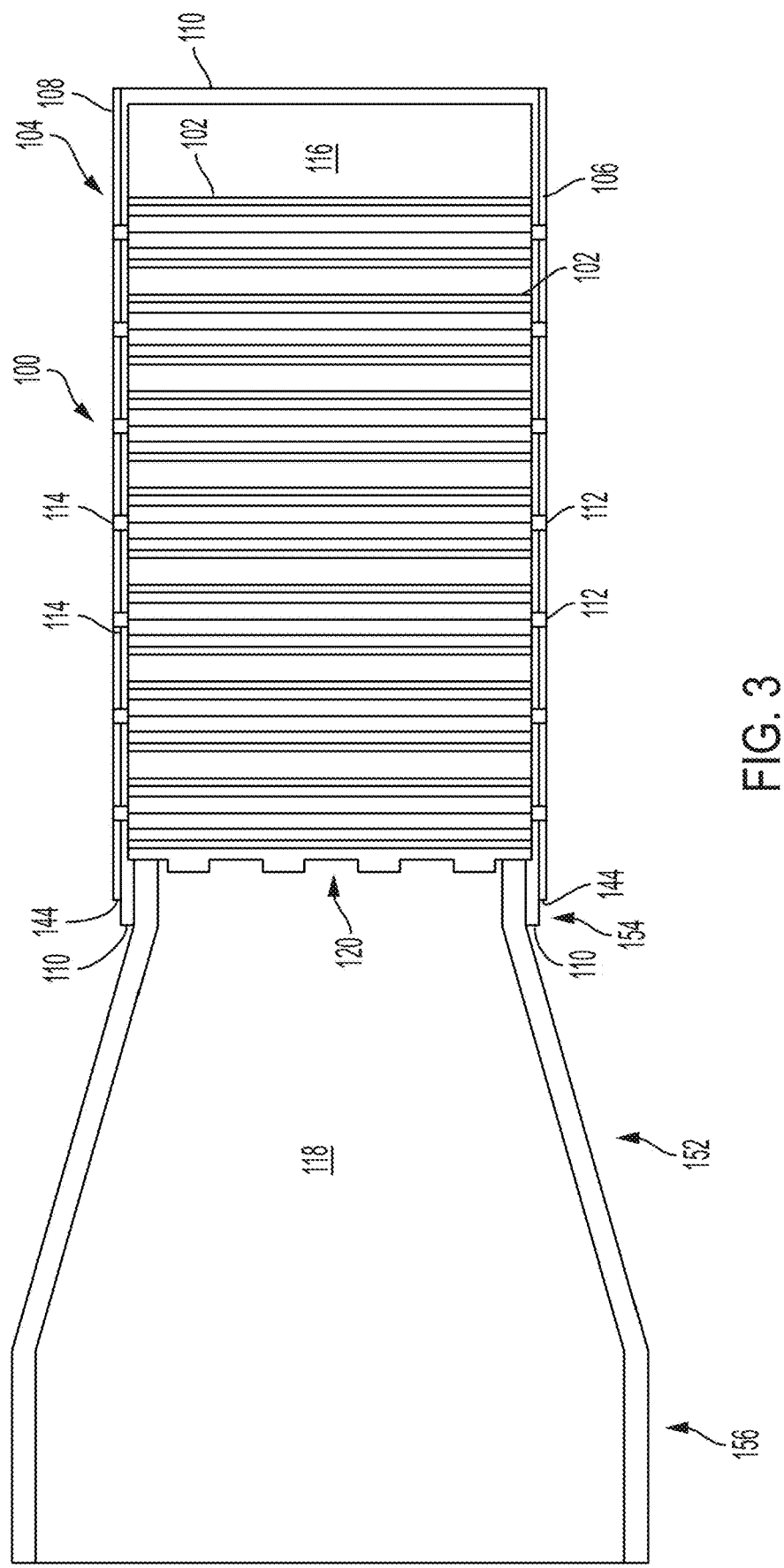
FIG. 3 is a top view of a breaking waves power generator according to the invention having a ramp with an alternative shape.
Figure 4:
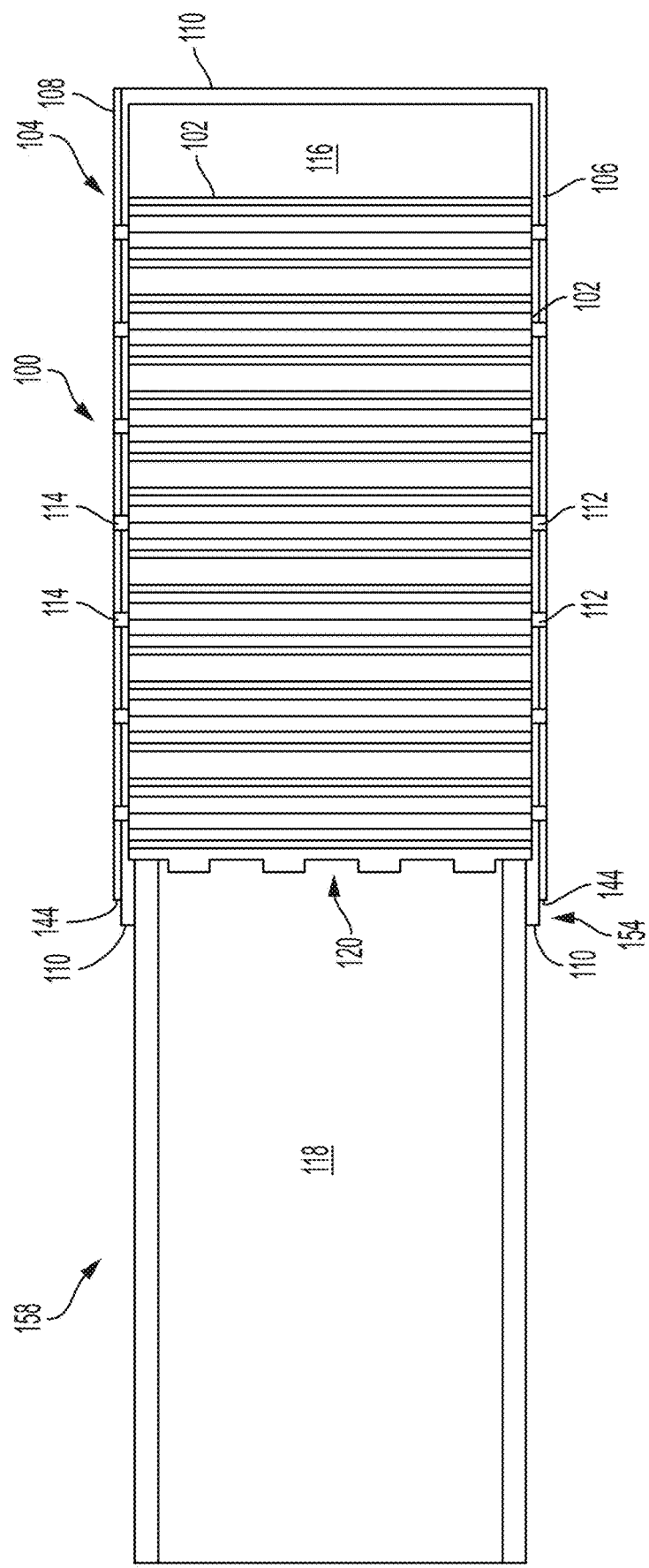
FIG. 4 is a top view of a breaking waves power generator according to the invention having a ramp with yet another alternative shape.

With reference to FIGS. 3 and 4, alternative designs of ramp 118 are illustrated. FIG. 3 illustrates a ramp 118 having a short rectangular portion 154 as in FIGS. 1 and 2 that extends to a flared portion 152, which in turn extends to a larger rectangular portion 156. FIG. 4 illustrates a ramp 118 having a single rectangular portion 158 with no flared portion.

The dimensions of breaking waves power generator 100 are determined by the maximum height of the waves that the breaking waves power generator is designed to have break through it. The radii of water wheels 102 should be approximately one and a half times greater than the maximum height of the waves breaking through them. The radius of the water wheels must be greater than the maximum height of the breaking waves, so that the axis of each water wheel is higher than the top of the waves. This dimension is fixed, but other dimensions are variable. The various parts of the breaking waves power generator, such as the base and walls of platform 104, ramp 118 and its walls, and wheels 102, can be made of stainless steel, which is strong but inexpensive.

Platform 104 and ramp 118 of breaking waves power generator 100 form in essence an artificial reef that is designed to make waves break over it, and the series of water wheels 102 on top of the breaking waves turns the breaking waves into mechanical rotational energy.

The number of water wheels 102 can vary, from one breaking waves power generator to another, depending on the size of the wheels. Generally, the bigger the waves, the greater the number of wheels that can be used effectively. For larger waves, about ten to fifteen wheels might be appropriate. A set of approximately ten 25-foot-diameter wheels could probably handle ten-foot waves. 15-foot-diameter wheels might be appropriate for five-foot waves. Ramp 118 may have a length of about 100 or 200 feet in certain embodiments. The necessary length of platform 104 is dependent on the number and size of wheels mounted thereon. The width of platform 104 (and the widths of wheels 102) can be limited only by the available space for the breaking waves power generator 100. For example, if the breaking waves power generator is deployed on a ship, the width of platform 104 may be limited only by the available space on the ship. One of the advantages of using the breaking waves power generator offshore on a ship is that tides are not a concern. Swells on the ocean can form with high crests, and the dimensions of water wheels 102 can be determined based on the maximum height of waves at a particular location. There are very few waves higher than 50 feet, and, more realistically, the average highest height of waves on the open ocean would be around 30 feet at the extreme.

While particular forms of the invention have been illustrated and described, it will be apparent that various modifications and combinations of the invention detailed in the text and drawings can be made without departing from the spirit and scope of the invention. Accordingly, it is not intended that the invention be limited, except as by the appended claims.

What is claimed is:

1. A breaking waves power generator, comprising:
   a platform;
   a plurality of water wheels rotatably mounted within the platform, each of the plurality of water wheels comprising a plurality of vanes, blades, paddles, or buckets that, when impacted by breaking water waves, cause rotation of the water wheel; and
   a deck plate mounted within the platform, over which breaking water waves can travel, the deck plate having an angular position relative to the platform that is adjustable to guide the breaking water waves so that the water waves break against the vanes, blades, paddles, or buckets of each of the plurality of water wheels, such that the water waves continue to break against the vanes, blades, paddles or buckets of each of the plurality of water wheels along the entirety of the length of the platform due to the adjustable angular position of the deck plate, causing rotation of each of the plurality of water wheels from which power is generated.

2. The breaking waves power generator in accordance with claim 1, further comprising a ramp connected to the platform in front of the at least one water wheel, over which water is guided to the platform so that water waves break against the at least one water wheel.

3. The breaking waves power generator in accordance with claim 2, wherein at least one of an angular or horizontal position of the ramp relative to the platform is adjustable to guide water to the platform so that water waves break against the at least one water wheel.

4. The breaking waves power generator in accordance with claim 2, further comprising two vertical walls attached to sides of the ramp, the vertical walls extending upwards from the ramp through a surface of the water.

5. The breaking waves power generator in accordance with claim 2, wherein at least a portion of the ramp is flared outwardly away from the platform to create a funnel that channels water into the at least one water wheel.

6. The breaking waves power generator in accordance with claim 2, further comprising at least one ballast tank having an interior space into which water can be pumped to assist with angular lower of the ramp or out of which water can be pumped to assist with angular raising of the ramp.

7. The breaking waves power generator in accordance with claim 1, wherein the deck plate is positioned underneath the at least one water wheel.

8. The breaking waves power generator in accordance with claim 1, wherein horizontal position of the deck plate relative to the platform is adjustable to guide water to the platform so that water waves break against the at least one water wheel.

9. A method for generating power from breaking waves, comprising:
   providing a platform, a plurality of water wheels mounted within the platform, each of the plurality of water wheels comprising a plurality of vanes, blades, paddles, or buckets, and a deck plate mounted within the platform;
   positioning the platform in water so that breaking water waves can travel over the deck plate;

adjusting an angular position of the deck plate relative to the platform to guide the breaking water waves so that the water waves break against the vanes, blades, paddles, or buckets of each of the plurality of water wheels, such that the water waves continue to break against the vanes, blades, paddles or buckets of each of the plurality of water wheels along the entirety of the length of the platform due to the adjustable angular position of the deck plate, to cause rotation of each of the plurality of water wheels from which power is generated.

10. The method in accordance with claim 9, further comprising providing a ramp connected to the platform in front of the at least one water wheel, over which water is guided to the platform so that water waves break against the at least one water wheel.

11. The method in accordance with claim 10, further comprising adjusting at least one of an angular position or a horizontal position of the ramp relative to the platform to guide water to the platform so that water waves break against the at least one water wheel.

12. The method in accordance with claim 10, further comprising providing two vertical walls attached to sides of the ramp, the vertical walls extending upwards from the ramp through a surface of the water.

13. The method in accordance with claim 10, wherein at least a portion of the ramp is flared outwardly away from the platform to create a funnel that channels water into the at least one water wheel.

14. The method in accordance with claim 10, further comprising pumping water into an interior space of at least one ballast tank to assist with angular lower of the ramp or pumping water out of the interior space of the at least one ballast tank to assist with angular raising of the ramp.

15. The method in accordance with claim 9, wherein the deck plate is positioned underneath the at least one water wheel.

16. The method in accordance with claim 9, further comprising adjusting a horizontal position of the deck plate relative to the platform to guide water to the platform so that water waves break against the at least one water wheel.

\* \* \* \* \*